(12) United States Patent
Chen et al.

(10) Patent No.: US 12,630,684 B2
(45) Date of Patent: May 19, 2026

(54) ARTICLE WITH CROSSLINKED FOAM LAYER ADHERED TO SUBSTRATE

(71) Applicant: Dow Global Technologies LLC, Midland, MI (US)

(72) Inventors: Yong Chen, Shanghai (CN); Wanfu Ma, Shanghai (CN); Xiaochun Liu, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 648 days.

(21) Appl. No.: 18/001,046

(22) PCT Filed: Jun. 9, 2020

(86) PCT No.: PCT/CN2020/095039
§ 371 (c)(1),
(2) Date: Dec. 7, 2022

(87) PCT Pub. No.: WO2021/248295
PCT Pub. Date: Dec. 16, 2021

(65) Prior Publication Data
US 2023/0235144 A1     Jul. 27, 2023

(51) Int. Cl.
| | |
|---|---|
| *B32B 27/06* | (2006.01) |
| *B32B 5/18* | (2006.01) |
| *B32B 7/12* | (2006.01) |
| *B32B 27/08* | (2006.01) |
| *B32B 27/18* | (2006.01) |
| *B32B 27/32* | (2006.01) |
| *C08J 9/00* | (2006.01) |
| *C08J 9/10* | (2006.01) |
| *C08J 9/16* | (2006.01) |
| *C08L 23/16* | (2006.01) |
| *C08L 53/00* | (2006.01) |
| *C09J 123/08* | (2006.01) |

(52) U.S. Cl.
CPC ........... *C08J 9/0061* (2013.01); *C08J 9/0042* (2013.01); *C08J 9/0066* (2013.01); *C09J 123/0815* (2013.01); *C08J 2201/026* (2013.01); *C08J 2353/00* (2013.01); *C08J 2423/16* (2013.01)

(58) Field of Classification Search
None
See application file for complete search history.

(56) References Cited

U.S. PATENT DOCUMENTS

| | | | |
|---|---|---|---|
| 4,201,698 A | 5/1980 | Itoh et al. | |
| 6,116,684 A | 9/2000 | Williams | |
| 7,148,284 B2 * | 12/2006 | Morrison | C09J 123/0853 |
| | | | 524/487 |
| 7,608,668 B2 | 10/2009 | Li Pi Shan et al. | |
| 7,666,918 B2 | 2/2010 | Prieto et al. | |
| 7,858,706 B2 | 12/2010 | Arriola et al. | |
| 7,893,166 B2 | 2/2011 | Shan et al. | |
| 7,947,793 B2 | 5/2011 | Marchand et al. | |
| 7,951,882 B2 | 5/2011 | Arriola et al. | |
| 8,389,655 B2 | 3/2013 | Arriola et al. | |
| 8,785,531 B2 | 7/2014 | Vansumeren et al. | |
| 10,301,447 B2 | 5/2019 | Sieradzki et al. | |
| 2008/0009586 A1 | 1/2008 | Vansumeren et al. | |
| 2011/0032621 A1 | 2/2011 | Marchand et al. | |
| 2011/0230108 A1 | 9/2011 | Arriola et al. | |
| 2012/0295086 A1 | 11/2012 | Baldwin et al. | |
| 2014/0033390 A1 * | 2/2014 | Falken | B32B 7/12 |
| | | | 442/221 |
| 2014/0336328 A1 | 11/2014 | Weaver et al. | |
| 2015/0025165 A1 | 1/2015 | Chen et al. | |
| 2015/0218331 A1 | 8/2015 | Low | |
| 2018/0334597 A1 * | 11/2018 | Eichler-Johnson | |
| | | | C09J 123/0853 |
| 2019/0119479 A1 | 4/2019 | Uno et al. | |
| 2020/0332099 A1 * | 10/2020 | Hu | C08L 23/0815 |

FOREIGN PATENT DOCUMENTS

| | | |
|---|---|---|
| CN | 1820034 B | 8/2006 |
| CN | 107200931 A | 9/2017 |
| JP | 1985-051768 A | 3/1985 |
| JP | 1995-047630 A | 2/1997 |
| JP | 2005-041913 A | 2/2005 |
| WO | 2013/038648 A1 | 3/2013 |
| WO | 2019/050469 A1 | 3/2019 |

* cited by examiner

*Primary Examiner* — Melissa A Rioja
(74) *Attorney, Agent, or Firm* — Boyle Fredrickson S.C.

(57) ABSTRACT

The present disclosure provides an article. The article includes a crosslinked foam composition, an adhesive layer, and a substrate composed of an olefin-based polymer. The crosslinked foam composition includes an ethylene/α-olefin multi-block copolymer, an ethylene/propylene/diene terpolymer (EPDM), optional silicone rubber, optional blend component selected from ethylene/α-olefin random copolymer, ethylene-vinyl acetate copolymer (EVA), styrene-butadiene block copolymer, hydrogenated styrene-butadiene block copolymer, and combinations thereof, optional plasticizer, optional filler, and optional additive.

16 Claims, 1 Drawing Sheet

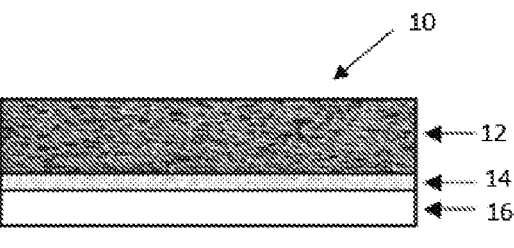
FIG. 1
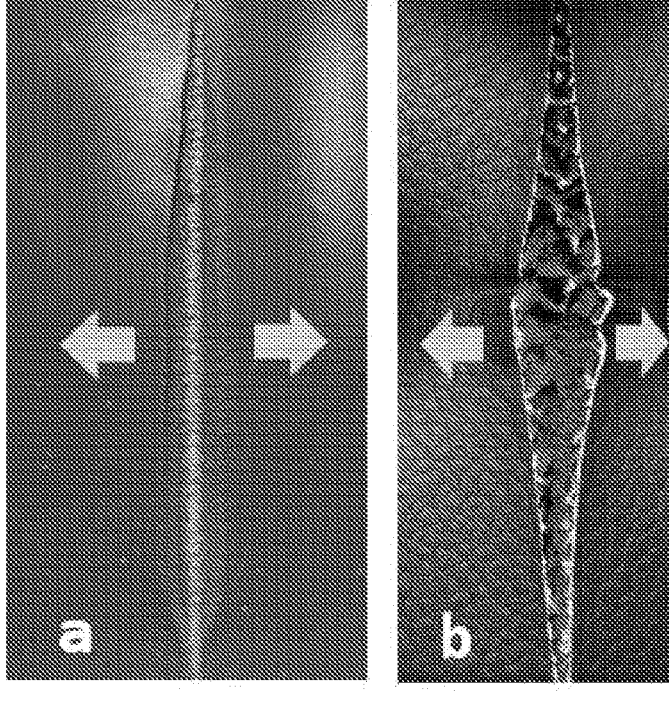
FIG. 2a                              FIG. 2b

ARTICLE WITH CROSSLINKED FOAM LAYER ADHERED TO SUBSTRATE

BACKGROUND

Bicycle saddles typically include two components. The first component is a supportive substrate formed from a rigid molded plastic such as polypropylene (PP). The second component is a soft pad typically composed of polyurethane (PU) foam and protected by an artificial leather skin layer composed of PU, polyvinyl chloride (PVC), or other artificial leather materials. Shortcomings exhibited by conventional PU foam based saddles include low toughness and poor water resistance. The skin layer for PU foam has low resistance to puncture which exposes the PU foam to the ambient environment. Once the skin is broken, the PU foam inside decays. The exposed PU foam readily absorbs water, leading to decay and foam rot.

Therefore, the art recognizes the need for a bicycle saddle foam with a balance of toughness, heat resistance and water resistance, and softness. Further recognized is the need for an article that adheres the foam (with the balance of toughness, heat resistance, water resistance, and softness) to a rigid molded substrate without delamination.

SUMMARY

The present disclosure provides an article. The article includes a crosslinked foam composition, an adhesive layer, and a substrate composed of an olefin-based polymer. The crosslinked foam composition includes an ethylene/α-olefin multi-block copolymer, an ethylene/propylene/diene terpolymer (EPDM), optional silicone rubber, optional blend component selected from ethylene/α-olefin random copolymer, ethylene-vinyl acetate copolymer (EVA), styrene-butadiene block copolymer, hydrogenated styrene-butadiene block copolymer, and combinations thereof, optional plasticizer, optional filler, and optional additive.

BRIEF DESCRIPTION OF THE DRAWINGS

FIG. 1 is a schematic representation of an article with a foam, an adhesive layer, and a substrate in accordance with an embodiment of the present disclosure.

FIG. 2a is a photograph showing the cut resistance of the foam for the article in accordance with an embodiment of the present disclosure.

FIG. 2b is a photograph showing the cut resistance of a prior art polyurethane foam with a polyurethane leather skin.

DEFINITIONS

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percentages are based on weight. For purposes of United States patent practice, the contents of any patent, patent application, or publication referenced herein are hereby incorporated by reference in their entirety (or the equivalent US version thereof is so incorporated by reference).

The numerical ranges disclosed herein include all values from, and including, the lower value and the upper value.

For ranges containing explicit values (e.g., a range from 1, or 2, or 3 to 5, or 6, or 7) any subrange between any two explicit values is included (e.g., the range 1-7 above includes subranges from 1 to 2; from 2 to 6; from 5 to 7; from 3 to 7; from 5 to 6; etc.).

Unless stated to the contrary, implicit from the context, or customary in the art, all parts and percentages are based on weight, and all test methods are current as of the filing date of this disclosure.

The term "composition," as used herein, refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

"Elastomer" and like terms refer to a rubber-like polymer that can be stretched to at least twice its original length and which retracts very rapidly to approximately its original length when the force exerting the stretching is released. An elastomer has an elastic modulus of about 10,000 psi (68.95 MPa) or less and an elongation usually greater than 200% in the uncrosslinked state at room temperature using the method of ASTM D638-72.

An "ethylene elastomer" and like terms refer to an elastomer composed of an ethylene-based polymer.

An "ethylene-based polymer," as used herein is a polymer that contains more than 50 weight percent polymerized ethylene monomer (based on the total amount of polymerizable monomers) and, optionally, may contain at least one comonomer.

The term "foam," or "foam article," as used herein, is a structure constructed from a polymer; the structure comprises a plurality of discrete gas pockets, or foam cells, completely surrounded by polymer. The term "foam cell," or "cell," as used herein, is a discrete space within the foam composition. The foam cell is separated, or otherwise is defined, by membrane walls composed of the polymer of the foam composition.

An "olefin-based polymer," or "polyolefin," as used herein is a polymer that contains more than 50 weight percent polymerized olefin monomer (based on total amount of polymerizable monomers), and optionally, may contain at least one comonomer. Nonlimiting examples of olefin-based polymer include ethylene-based polymer and propylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to as being based on "units" that are the polymerized form of a corresponding monomer.

A "propylene-based polymer" is a polymer that contains more than 50 weight percent polymerized propylene monomer (based on the total amount of polymerizable monomers) and, optionally, may contain at least one comonomer.

Test Methods

Asker C Hardness of foam structures was measured in accordance with ASTM D2240 on plaques with the dimensions 15 cm (length)×15 cm (width)×2 cm (thickness) both before lamination and after lamination. Each sample was measured at least 3 times (with a 3 second latency between each measurement) across the surface of the sample. The average of the measurements was recorded as Asker C Hardness.

Bonding strength was tested by a Dow internal method. Foam slice with the size of 130 mm×35 mm×3 mm (length× width×thickness) was bonded onto injection molded plastic sheet with the same size. The laminates were tested by a stretching machine at a peel speed of 100 mm/minute with a peel angle around 120 degree (between the plastic sheet and foam slice). The bonding strength was recorded as the average value of the maximum force of at least three specimens.

Compression set was measured in accordance with ASTM D395-B. Samples had a thickness of 19±0.5 mm, a diameter of 26±0.5 mm, and a deflection of 50%. The test was carried out at 23° C. for 24 hours and at 50° C. for 6 hours.

Differential Scanning Calorimetry (DSC)

Differential Scanning calorimetry (DSC) can be used to measure the melting, crystallization, and glass transition behavior of a polymer over a wide range of temperature. For example, the TA Instruments Q2000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (about 25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C., and held isothermal for 3 minutes in order to remove its thermal history. Next, the sample is cooled to −80° C. at a 10° C./minute cooling rate and held isothermal at −80° C. for 3 minutes. The sample is then heated to 180° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are extrapolated onset of melting, Tm, and extrapolated onset of crystallization, Tc. Heat of fusion (H$_f$) (in Joules per gram), and the calculated % crystallinity for polyethylene samples using the following Equation: % Crystallinity=((H$_f$)/292 J/g)×100.

The heat of fusion (H$_f$) (also known as melt enthalpy) and the peak melting temperature are reported from the second heat curve.

Melting point, Tm, is determined from the DSC heating curve by first drawing the baseline between the start and end of the melting transition. A tangent line is then drawn to the data on the low temperature side of the melting peak. Where this line intersects the baseline is the extrapolated onset of melting (Tm). This is as described in Bernhard Wunderlich, *The Basis of Thermal Analysis, in Thermal Characterization of Polymeric Materials* 92, 277-278 (Edith A. Turi ed., 2d ed. 1997).

Glass transition temperature, Tg, is determined from the DSC heating curve where half the sample has gained the liquid heat capacity as described in Bernhard Wunderlich, *The Basis of Thermal Analysis, in Thermal Characterization of Polymeric Materials* 92, 278-279 (Edith A. Turi ed., 2d ed. 1997). Baselines are drawn from below and above the glass transition region and extrapolated through the Tg region. The temperature at which the sample heat capacity is half-way between these baselines is the Tg.

Density of foam article is measured in accordance with ASTM D-1622-88 with results reported in kilograms per cubic meter (kg/m$^3$) or grams per cubic centimeter (g/cc) at 25° C.

Density of polymer is measured in accordance with ASTM D792 with results reported in g/cc at 25° C.

Elongation (ultimate) was measured according to ASTM D638 with a tensile speed of 500 mm/min.

Melt flow rate (or MFR) measurement (for the propylene-based polymers) is performed according to ASTM D1238, Condition 230° C./2.16 kilogram (kg) weight. As with the melt index, the melt flow rate is inversely proportional to the molecular weight of the polymer. Thus, the higher the molecular weight, the lower the melt flow rate, although the relationship is not linear.

Melt index (MI or (2) (for ethylene-based polymers) is measured in accordance with ASTM D 1238, Condition 190° C./2.16 kg with results reported in grams per 10 minutes (g/10 min).

Melt viscosity is measured using a Brookfield Viscometer Model, and a Brookfield RV-DV-II-Pro viscometer spindle 31 at 177° C. (or other identified temperature). The sample is poured into the chamber, which is, in turn, inserted into a Brookfield Thermosel, and locked into place. The sample chamber has a notch on the bottom that fits the bottom of the Brookfield Thermosel, to ensure that the chamber is not allowed to turn, when the spindle is inserted and spinning. The sample (approximately 8-10 grams of resin) is heated to the required temperature, until the melted sample is about one inch below the top of the sample chamber. The viscometer apparatus is lowered, and the spindle submerged into the sample chamber. Lowering is continued, until the brackets on the viscometer align on the Thermosel. The viscometer is turned on, and set to operate at a shear rate, which leads to a torque reading in the range of 40 to 60 percent of the total torque capacity, based on the rpm output of the viscometer. Readings are taken every minute for about 15 minutes, or until the values stabilize, at which point, a final reading is recorded.

Rebound is measured according to ASTM D3574. A steel ball is dropped on a foam specimen and the height of rebound of the ball is recorded. The specimen size is 100 mm×100 mm×50 mm (width×length×thickness). The mean of medians obtained from three samples is reported in percent as the ball rebound resilience value of the sample.

Shore A Hardness is measured in accordance with ASTM D2240-05.

Tensile strength. The present compositions can be characterized by their tensile strength at break (in MPa) and elongation at break (%). Tensile strength and tensile elongation are measured in accordance with the ASTM D638 testing procedure on compression molded samples prepared according to ASTM D4703. Elongation at break, or elongation to break, is the strain on a sample when it breaks, expressed as a percent.

Thermal shrinkage is used to measure thermal resistance of the foams and is measured with a Dow internal method. The specimen size is 75 mm×75 mm×10 mm (width× length×thickness). The specimen is treated in a hot oven at 65° C. for 72 hours and at 70° C. for 40 minutes and then taken out for conditioning at room temperature for 24 hours. The sample size after heat treatment is measured and the change of surface area (length×width) is recorded in percent as thermal shrinkage value. The mean value obtained from at least three specimens is reported as the final thermal shrinkage value.

DETAILED DESCRIPTION

The present disclosure provides an article. The article includes a crosslinked foam composition, an adhesive layer, and a substrate composed of an olefin-based polymer. The crosslinked foam composition includes an ethylene/α-olefin multi-block copolymer, an ethylene/propylene/diene terpolymer (EPDM), optional silicone rubber, optional blend component selected from ethylene/α-olefin random copolymer, ethylene-vinyl acetate copolymer (EVA), styrene-butadiene block copolymer, hydrogenated styrene-butadiene block copolymer, and combinations thereof, optional plasticizer, optional filler, and optional additive.

A. Crosslinked Foam Composition

The article includes a crosslinked foam composition. The term "crosslinked foam composition," as used herein, is a foam composed of the (i) ethylene/α-olefin multi-block copolymer, (ii) ethylene/propylene/diene terpolymer (EPDM), (iii) optional silicone rubber, (iv) optional blend component selected from ethylene/α-olefin random copolymer, ethylene-vinyl acetate copolymer (EVA), styrene-butadiene block copolymer, hydrogenated styrene-butadiene block copolymer, and combinations thereof, (v) optional plasticizer, (vi) optional filler, and (vii) optional additive, the foam being crosslinked. The crosslinked foam composition is formed from a foamable composition. The term "foamable composition," as used herein, is a mixture of the (i) ethylene/α-olefin multi-block copolymer, (ii) ethylene/propylene/diene terpolymer (EPDM), (iii) optional silicone rubber, (iv) optional blend component selected from ethylene/α-olefin random copolymer, ethylene-vinyl acetate copolymer (EVA), styrene-butadiene block copolymer, hydrogenated styrene-butadiene block copolymer, and combinations thereof, (v) optional plasticizer, (vi) optional filler, (vii) optional additive, (viii) crosslinking agent/coagent, and (ix) blowing agent/accelerator under the compounding conditions. The crosslinked foam composition is the resultant product of the foamable compositions being subjected to a foaming process.

The foamable composition (and the resultant crosslinked foam composition) includes an ethylene/α-olefin multi-block copolymer. The term "ethylene/α-olefin multi-block copolymer" refers to an ethylene/$C_4$-$C_8$ α-olefin multi-block copolymer consisting of ethylene and one copolymerizable $C_4$-$C_8$ α-olefin comonomer in polymerized form (and optional additives), the polymer characterized by multiple blocks or segments of two polymerized monomer units differing in chemical or physical properties, the blocks joined (or covalently bonded) in a linear manner, that is, a polymer comprising chemically differentiated units which are joined end-to-end with respect to polymerized ethylenic functionality. Ethylene/α-olefin multi-block copolymer includes block copolymer with two blocks (di-block) and more than two blocks (multi-block). The $C_4$-$C_8$ α-olefin is selected from butene, hexene, and octene. The ethylene/α-olefin multi-block copolymer is void of, or otherwise excludes, styrene (i.e., is styrene-free), and/or vinyl aromatic monomer, and/or conjugated diene. When referring to amounts of "ethylene" or "comonomer" in the copolymer, it is understood that this refers to polymerized units thereof. In some embodiments, the ethylene/α-olefin multi-block copolymer can be represented by the following formula: $(AB)_n$; where n is at least 1, preferably an integer greater than 1, such as 2, 3, 4, 5, 10, 15, 20, 30, 40, 50, 60, 70, 80, 90, 100, or higher, "A" represents a hard block or segment, and "B" represents a soft block or segment. The As and Bs are linked, or covalently bonded, in a substantially linear fashion, or in a linear manner, as opposed to a substantially branched or substantially star-shaped fashion. In other embodiments, A blocks and B blocks are randomly distributed along the polymer chain. In other words, the block copolymers usually do not have a structure as follows: AAA-AA-BBB-BB. In an embodiment, the ethylene/α-olefin multi-block copolymer does not have a third type of block, which comprises different comonomer(s). In another embodiment, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

In an embodiment, ethylene comprises the majority mole fraction of the whole ethylene/α-olefin multi-block copolymer, i.e., ethylene comprises at least 50 wt % of the whole ethylene/α-olefin multi-block copolymer. More preferably, ethylene comprises at least 60 wt %, at least 70 wt %, or at least 80 wt %, with the substantial remainder of the whole ethylene/α-olefin multi-block copolymer comprising the $C_4$-$C_8$ α-olefin comonomer. In an embodiment, the ethylene/α-olefin multi-block copolymer contains 50 wt % to 90 wt % ethylene, or 60 wt % to 85 wt % ethylene, or 65 wt % to 80 wt % ethylene. For many ethylene/octene multi-block copolymers, the composition comprises an ethylene content greater than 80 wt % of the whole ethylene/octene multi-block copolymer and an octene content of from 10 wt % to 15 wt %, or from 15 wt % to 20 wt % of the whole multi-block copolymer.

The ethylene/α-olefin multi-block copolymer includes various amounts of "hard" segments and "soft" segments. "Hard" segments are blocks of polymerized units in which ethylene is present in an amount greater than 90 wt %, or 95 wt %, or greater than 95 wt %, or greater than 98 wt %, based on the weight of the polymer, up to 100 wt %. In other words, the comonomer content (content of monomers other than ethylene) in the hard segments is less than 10 wt %, or 5 wt %, or less than 5 wt %, or less than 2 wt %, based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 wt %, or greater than 8 wt %, greater than 10 wt %, or greater than 15 wt %, based on the weight of the polymer. In an embodiment, the comonomer content in the soft segments is greater than 20 wt %, greater than 25 wt %, greater than 30 wt %, greater than 35 wt %, greater than 40 wt %, greater than 45 wt %, greater than 50 wt %, or greater than 60 wt % and can be up to 100 wt %.

The soft segments can be present in an ethylene/α-olefin multi-block copolymer from 1 wt % to 99 wt % of the total weight of the ethylene/α-olefin multi-block copolymer, or from 5 wt % to 95 wt %, from 10 wt % to 90 wt %, from 15 wt % to 85 wt %, from 20 wt % to 80 wt %, from 25 wt % to 75 wt %, from 30 wt % to 70 wt %, from 35 wt % to 65 wt %, from 40 wt % to 60 wt %, or from 45 wt % to 55 wt % of the total weight of the ethylene/α-olefin multi-block copolymer. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608, 668, entitled "Ethylene/α-Olefin Block Inter-Polymers," filed on Mar. 15, 2006, in the name of Colin L. P. Shan, Lonnie Hazlitt, et. al, and assigned to Dow Global Technologies Inc., the disclosure of which is incorporated by reference herein in its entirety. In particular, hard and soft segment weight percentages and comonomer content may be determined as described in column 57 to column 63 of U.S. Pat. No. 7,608,668.

The ethylene/α-olefin multi-block copolymer comprises two or more chemically distinct regions or segments (referred to as "blocks") joined (or covalently bonded) in a linear manner, that is, it contains chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present ethylene/α-olefin multi-block copolymer is characterized by unique distributions of both polymer polydispersity (PDI or Mw/Mn or MWD), polydisperse block length distribution, and/or polydisperse block number distribution, due, in an embodiment, to the effect of the shuttling agent(s) in combination with multiple catalysts used in their preparation.

In an embodiment, the ethylene/α-olefin multi-block copolymer is produced in a continuous process and possesses a polydispersity index (Mw/Mn) from 1.7 to 3.5, or from 1.8 to 3, or from 1.8 to 2.5, or from 1.8 to 2.2. When produced in a batch or semi-batch process, the ethylene/α-olefin multi-block copolymer possesses Mw/Mn from 1.0 to 3.5, or from 1.3 to 3, or from 1.4 to 2.5, or from 1.4 to 2.

In addition, the ethylene/α-olefin multi-block copolymer possesses a PDI (or Mw/Mn) fitting a Schultz-Flory distribution rather than a Poisson distribution. The present ethylene/α-olefin multi-block copolymer has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the present ethylene/α-olefin multi-block copolymer possesses a most probable distribution of block lengths.

In a further embodiment, the ethylene/α-olefin multi-block copolymer of the present disclosure, especially those made in a continuous, solution polymerization reactor, possess a most probable distribution of block lengths. In one embodiment of this disclosure, ethylene/α-olefin multi-block copolymers are defined as having:

(A) Mw/Mn from about 1.7 to about 3.5, at least one melting point, Tm, in degrees Celsius, and a density, d, in grams/cubic centimeter, where in the numerical values of Tm and d correspond to the relationship:

$$Tm > -2002.9 \pm 4538.5(d) - 2422.2(d)^2, \text{ and/or}$$

(B) Mw/Mn from about 1.7 to about 3.5, and is characterized by a heat of fusion, ΔH in J/g, and a delta quantity, ΔT, in degrees Celsius defined as the temperature difference between the tallest DSC peak and the tallest Crystallization Analysis Fractionation ("CRYSTAF") peak, wherein the numerical values of ΔT and ΔH have the following relationships:

$$\Delta T > -0.1299 \, \Delta H + 62.81 \text{ for } \Delta H \text{ greater than zero and} \\ \text{up to 130 J/g}$$

$$\Delta T \geq 48° \text{ C. for } \Delta H \text{ greater than 130 J/g}$$

wherein the CRYSTAF peak is determined using at least 5 percent of the cumulative polymer, and if less than 5 percent of the polymer has an identifiable CRYSTAF peak, then the CRYSTAF temperature is 30° C.; and/or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re > 1481 - 1629(d); \text{ and/or}$$

(D) has a molecular fraction which elutes between 40° C., and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer; and/or (E) has a storage modulus at 25° C., G' (25° C.), and a storage modulus at 100° C., G' (100° C.), wherein the ratio of G' (25° C.) to G' (100° C.) is in the range of 1:1 to 9:1.

The ethylene/α-olefin multi-block copolymer may also have:

(F) a molecular fraction which elutes between 40° C., and 130° C. when fractionated using TREF, characterized in that the fraction has a block index of at least 0.5 and up to 1 and a molecular weight distribution, Mw/Mn, greater than 1.3; and/or (G) average block index greater than zero and up to 1.0 and a molecular weight distribution, Mw/Mn greater than 1.3.

It is understood that the ethylene/α-olefin multi-block copolymer may have one, some, all, or any combination of properties (A)-(G). Block Index can be determined as described in detail in U.S. Pat. No. 7,608,668 herein incorporated by reference for that purpose. Analytical methods for determining properties (A) through (G) are disclosed in, for example, U.S. Pat. No. 7,608,668, col. 31 line 26 through col. 35 line 44, which is herein incorporated by reference for that purpose.

In an embodiment, the ethylene/α-olefin multi-block copolymer has hard segments and soft segments, is styrene-free, consists of only (i) ethylene and (ii) a $C_4$-$C_8$ α-olefin or $C_8$ α-olefin (and optional additives), and is defined as having a Mw/Mn from 1.7 to 3.5, at least one melting point, Tm, in degrees Celsius, and a density, d, in grams/cubic centimeter, wherein the numerical values of Tm and d correspond to the relationship:

$$Tm > -2002.9 + 4538.5(d) - 2422.2(d)^2,$$

where the density, d, is from 0.850 g/cc, or 0.860 g/cc, or 0.870 g/cc to 0.875 g/cc, or 0.877 g/cc, or 0.880 g/cc, or 0.890 g/cc; and the melting point, Tm, is from 110° C., or 115° C., or 120° C. to 125° C., or 130° C., or 135° C.

In an embodiment, the ethylene/α-olefin multi-block copolymer is an ethylene/1-octene multi-block copolymer (consisting only of ethylene and octene comonomer) and has one, some, or all of the following properties:

(i) a Mw/Mn from 1.7, or 1.8 to 2.2, or 2.5, or 3.5; and/or
  (ii) a density from 0.860 g/cc, or 0.865 g/cc, to 0.870 g/cc, or 0.877 g/cc, or 0.880 g/cc; and/or
  (iii) a melting point, Tm, from 115° C., or 118° C., or 119° C., or 120° C. to 120° C., or 123° C., or 125° C.; and/or
  (iv) a melt index (MI) from 0.1 g/10 min, or 0.5 g/10 min to 1.0 g/10 min, or 2.0 g/10 min, or 5 g/10 min, or 10 g/10 min; and/or
  (v) from 50 to 85 wt % soft segment and from 40 to 15 wt % hard segment (based on total weight of the ethylene/octene multi-block copolymer); and/or
  (vi) from 10 mol %, or 13 mol %, or 14 mol %, or 15 mol % to 16 mol %, or 17 mol %, or 18 mol %, or 19 mol %, or 20 mol % octene in the soft segment; and/or
  (vii) from 0.5 mol %, or 1.0 mol %, or 2.0 mol %, or 3.0 mol % to 4.0 mol %, or 5 mol %, or 6 mol %, or 7 mol %, or 9 mol % octene in the hard segment; and/or
  (viii) an elastic recovery (Re) from 50%, or 60% to 70%, or 80%, or 90%, at 300% min 1 deformation rate at 21° C. as measured in accordance with ASTM D 1708; and/or
  (ix) a polydisperse distribution of blocks and a polydisperse distribution of block sizes (hereafter referred to as multi-block copolymer properties (i)-(ix)).

In an embodiment, the ethylene/α-olefin multi-block copolymer is an ethylene/octene multi-block copolymer. The ethylene/octene multi-block copolymer is sold under the tradename INFUSE™, available from The Dow Chemical Company, Midland, Michigan, USA.

The ethylene/α-olefin multi-block copolymer can be produced via a chain shuttling process such as described in U.S. Pat. No. 7,858,706, which is herein incorporated by reference. In particular, suitable chain shuttling agents and related information are listed in col. 16 line 39 through col. 19 line 44. Suitable catalysts are described in col. 19 line 45 through col. 46 line 19 and suitable co-catalysts in col. 46 line 20 through col. 51 line 28. The process is described throughout the document, but particularly in col. 51 line 29 through col. 54 line 56. The process is also described, for example, in the following: U.S. Pat. Nos. 7,608,668; 7,893, 166; and 7,947,793.

The base ethylene/α-olefin multi-block copolymer may include more than one ethylene/α-olefin multi-block copolymer.

In an embodiment, the ethylene/α-olefin multi-block copolymer is present in the crosslinked foam composition from 50 wt %, or 52 wt %, or 54 wt %, or 56 wt %, or 58 wt %, to 62 wt %, or 64 wt %, or 66 wt %, or 68 wt %, or 70 wt %, based on the total weight of the crosslinked foam composition.

The foamable composition (and the resultant crosslinked foam composition) includes an ethylene/propylene/diene terpolymer (EPDM). An "ethylene/propylene/diene terpolymer" ("EPDM") is a polymer with a majority weight percent (i.e., greater than 50 wt %) of units derived from ethylene, and also includes units derived from propylene comonomer, and units derived from a diene comonomer. The EPDM is composed of, or otherwise consists of ethylene, propylene, and one diene comonomer in polymerized form.

The EPDM terpolymer includes units derived from a diene monomer. The diene can be conjugated-, non-conjugated-, straight chain-, branched chain- or cyclic-hydrocarbon diene having from 6 to 15 carbon atoms. Nonlimiting examples of suitable diene include 1,4-hexadiene; 1,6-octadiene; 1,7-octadiene; 1,9-decadiene; branched chain acyclic diene, such as 5-methyl-1,4-hexadiene, 3,7-dimethyl-1,6-octadiene, 3,7-dimethyl-1,7-octadiene and mixed isomers of dihydromyricene and dihydroocinene; single ring alicyclic dienes, such as 1,3-cyclopentadiene, 1,4-cyclohexadiene, 1,5-cyclooctadiene and 1,5-cyclododecadiene; and multi-ring alicyclic fused and bridged ring dienes, such astetra-hydroindene, methyl tetrahydroindene, bicyclo-(2,2,1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, 5-vinyl-2-norbornene, norbornadiene, 5-ethylidene-2-norbornene (ENB), 5-vinylidene-2-norbornene (VNB), 5-methylene-2-norbornene (MNB), dicyclopentadiene (DCPD); and combinations thereof. Further nonlimiting examples of suitable diene include 4-methyl-1,4-hexadiene, 7-methyl-1,6-octadiene, 5,7-dimethyl-1,6-octadiene, 3,7,11-trimethyl-1,6,10-octatriene, 6-methyl-1,5-heptadiene, 1,3-butadiene, 1,6-heptadiene, 1,8-nonadiene, 1,9-decadiene, 1,10-undecadiene, 1,5-cyclododecadiene, bicyclo[2.2.1]hepta-2,5-diene (norbornadiene), tetracyclododecene, butadiene, dicyclopentadiene, vinyl norbornene, mixed isomers of dihydromyricene and dihydroocinene, tetrahydroindene, methyl tetrahydroindene, 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and combinations thereof.

The EPDM terpolymer contains from 40 wt % to 80 wt %, or from 60 wt % to 80 wt %, or from 65 wt % to 75 wt % ethylene, and has a diene content from 0.2 wt % to 1.5 wt %, or from 0.3 wt % to 0.8 wt %, or from 0.4 to 0.7 wt %, and the diene is ENB, wherein weight percent is based on total weight of the EPDM terpolymer. The EPDM terpolymer has a density from 0.865 g/cc to 0.885 g/cc and a Mooney viscosity (125° C., ML 1+4) from 15 to 25. The EPDM terpolymer is present in the crosslinked foam composition in an amount from 16 wt % to 36 wt %, based on the total weight of the crosslinked foam composition.

In an embodiment, the EPDM terpolymer is an ethylene/propylene/ENB terpolymer and has one, some, or all of the following properties:

(i) a density from 0.860 g/cc to 0.890 g/cc, or from 0.865 g/cc to 0.885 g/cc; and/or (ii) a Mooney viscosity (125° C., ML 1+4), from 10 to 40, or from 15 to 25, or from 17 to 23; and/or (iii) an ethylene content from 45 wt % to 80 wt %, or from 60 wt % to 80 wt %, or from 60 wt % to 75 wt %, or from 65 wt % to 75 wt %; and/or (iv) an ENB content from 0.2 wt % to 9.5 wt %, or from 0.3 wt % to 8.0 wt %, or from 0.4 wt % to 6.0 wt %, or from 0.4 wt % to 5.0 wt %, or from 0.4 wt % to 3.5 wt %, or from 0.4 wt % to 2 wt %, or from 0.4 wt % to 1 wt %, or from 0.2 wt % to 1.5 wt %, or from 0.3 wt % to 0.9 wt %, or from 0.3 wt % to 0.7 wt %, wherein weight percent is based on total weight of the EPDM terpolymer (hereafter referred to as EPDM properties (i)-(iv)).

A nonlimiting example of a suitable EPDM terpolymer is NORDEL™ IP 3720P, available from The Dow Chemical Company.

The crosslinked foam composition includes optional silicone rubber. When the silicone rubber is present in the foam composition, the silicone rubber is selected from polysiloxanes, polydimethylsiloxanes, and combinations thereof. The silicone rubber has a density from 1.00 g/cc to 1.20 g/cc, and a Shore A hardness from 40 to 65. The crosslinked foam composition contains silicone rubber in an amount from 0 wt % or greater than 0 wt %, or 2 wt %, or 4 wt %, to 7 wt %, or 9 wt %, or 11 wt %, based on the total weight of the crosslinked foam composition.

In an embodiment, the silicone rubber has one, some, or all of the following properties:

(i) a density from 1.00 g/cc, or 1.04 g/cc, or 1.08 g/cc, or 1.12 g/cc, to 1.16 g/cc, or 1.18 g/cc, or 1.20 g/cc; and/or (ii) a Shore A hardness from 40, or 45, or 50, to 55, or 60, or 65 (hereafter referred to as SiR properties (i)-(ii)).

A nonlimiting example of a suitable silicone rubber is XIAMETER RBB-2003-50, available from The Dow Chemical Company.

The crosslinked composition includes optional blend component. When the blend component is present in the foam composition, it is selected from ethylene/α-olefin random copolymer, ethylene-vinyl acetate copolymer, styrene-butadiene block copolymer, hydrogenated styrene-butadiene block copolymer, and combinations thereof.

In an embodiment, the blend component is an ethylene/α-olefin random copolymer. The ethylene/α-olefin random copolymer is a copolymer containing monomers of ethylene and monomers of one or more α-olefin(s) polymerized together to form a polymer wherein the individual repeating units are present in a random or statistical distribution in the polymer chain. The crosslinked foam composition contains ethylene/α-olefin random copolymer in an amount from 0 wt %, or greater than 0 wt %, or 10 wt %, or 20 wt %, or 30 wt %, to 40 wt %, or 50 wt %, or 60 wt %, or 70 wt %, based on the total weight of the crosslinked foam composition.

A nonlimiting example of a suitable ethylene/α-olefin random copolymer is a polyolefin elastomer sold under the trade name ENGAGE™, available from The Dow Chemical Company.

In an embodiment, the blend component is an ethylene-vinyl acetate copolymer. The ethylene-vinyl acetate copolymer is a copolymer composed of, or otherwise consists of ethylene and vinyl acetate in polymerized form. The crosslinked foam composition contains ethylene-vinyl acetate copolymer in an amount from 0 wt %, or greater than 0 wt %, or 10 wt %, or 20 wt %, or 30 wt %, to 40 wt %, or 50 wt %, or 60 wt %, or 70 wt %, based on the total weight of the crosslinked foam composition.

In an embodiment, the blend component is a styrene-butadiene block copolymer. The styrene-butadiene block copolymer is a copolymer having at least one block segment of a styrenic monomer in combination with at least one block segment of butadienic comonomer. When the styrene-butadiene block copolymer is present in the foam composition, it is selected from styrene/butadiene/styrene block copolymer (SBS), α-methylstyrene/butadiene/α-methylstyrene block copolymer (mSBmS), α-methylstyrene/butadiene/styrene block copolymer, styrene/butadiene/styrene/butadiene/styrene block copolymer (SBSBS), and combinations thereof. The crosslinked foam composition contains styrene-butadiene block copolymer in an amount from 0 wt %, or greater than 0 wt %, or 10 wt %, or 20 wt %, or 30 wt %, to 40 wt %, or 50 wt %, or 60 wt %, or 70 wt %, based on the total weight of the crosslinked foam composition.

In an embodiment, the blend component is a hydrogenated styrene-butadiene block copolymer. The hydrogenated styrene-butadiene block copolymer is a copolymer with at least 90% of double bonds present in styrenic blocks of styrene-butadiene block copolymer are hydrogenated or saturated and at least 95% of double bonds present in butadienic blocks are hydrogenated or saturated. The crosslinked foam composition contains hydrogenated styrene-butadiene block copolymer in an amount from 0 wt %, or greater than 0 wt %, or 10 wt %, or 20 wt %, or 30 wt %, to 40 wt %, or 50 wt %, or 60 wt %, or 70 wt %, based on the total weight of the crosslinked foam composition.

The crosslinked foam composition includes optional plasticizer. When the plasticizer is present in the foam composition the plasticizer is selected from an aromatic oil, a mineral oil, a naphthenic oil, a paraffinic oil, a triglyceride-based vegetable oil, a synthetic hydrocarbon oil, a silicone oil, and combinations thereof. The crosslinked foam composition contains plasticizer in an amount from 0 wt %, or greater than 0 wt %, or 5 wt %, or 10 wt %, or 15 wt %, to 20 wt %, or 25 wt %, or 30 wt %, based on the total weight of the crosslinked foam composition.

In an embodiment, the plasticizer is a mineral oil and is present in an amount from greater than 0 wt %, or 5 wt %, or 10 wt %, or 15 wt %, to 20 wt %, or 25 wt %, or 30 wt %, based on the total weight of the crosslinked foam composition.

A nonlimiting example of a suitable mineral oil is SUNPAR™ 2280, available from the Sunoco Inc.

The crosslinked foam composition includes optional filler. When the filler is present in the foam composition the filler is selected from talc, silicon dioxide ($SiO_2$), calcium carbonate ($CaCO_3$), mica, glass fibers, carbon black (CB), and combinations thereof. The crosslinked foam composition contains filler in an amount from 0 wt %, or greater than 0 wt %, or 1 wt %, or 2 wt %, or 3 wt %, or 4 wt %, to 5 wt %, or 6 wt %, or 7 wt %, or 8 wt %, or 9 wt %, or up to 20 wt %, based on the total weight of the crosslinked foam composition.

In an embodiment, the filler is talc and is present in an amount from greater than 0 wt % to 20 wt %, or from 1 wt % to 9 wt %, or from 2 wt % to 7 wt %, or from 3 wt % to 6 wt %, or from 4 wt % to 5 wt %, based on the total weight of the crosslinked foam composition.

The crosslinked foam composition includes optional additives. When the additive is present, nonlimiting examples of suitable additives include pigments (carbon black, titanium dioxide), antioxidants, acid scavengers, ultraviolet light stabilizer (e.g., hindered amine light stabilizer such as N,N'-bisformyl-N,N'-bis(2,2,6,6-tetramethyl-4-piperidinyl)-hexamethylenediamine), flame retardants, processing aids, extrusion aids, antistatic agents, UV inhibitors, coloring agents, and combinations thereof. In an embodiment, the additive is selected from the group consisting of a processing aid, a UV inhibitor, a coloring agent, and combinations thereof.

In an embodiment, the additive is present in the crosslinked foam composition from 0 wt %, or greater than 0 wt %, or 1 wt %, or 2 wt %, or 3 wt %, to 4 wt %, 5 wt %, or 6 wt %, or 7 wt %, or 8 wt %, or 9 wt %, based on the total weight of the crosslinked foam composition.

In an embodiment, the additive is selected from a processing aid, a UV inhibitor, a coloring agent, and combinations thereof and is present in an amount from 0 wt % to 9 wt %, or from greater than 0 wt % to 9 wt %, or from 1 wt % to 8 wt %, or from 2 wt % to 7 wt %, or from 2 wt % to 6 wt %, or from 3 wt % to 6 wt %, or from 3 wt % to 5 wt %, or from 2 wt % to 4 wt %, based on the total weight of the crosslinked foam composition.

In an embodiment, the additive in the crosslinked foam composition includes (i) from 0.3 wt % to 5.0 wt % of polyethylene glycol (PEG), (ii) from 0.5 wt % to 5.0 wt % of TiO$_2$, (iii) from 0.3 wt % to 5.0 wt % of color masterbatch (MB), based on the total weight of the crosslinked foam composition.

In an embodiment, the additive in the crosslinked foam composition includes (i) from 0.5 wt % to 2.0 wt % of polyethylene glycol (PEG), (ii) from 1.0 wt % to 5.0 wt % of TiO$_2$, (iii) from 0.5 wt % to 2.0 wt % of color masterbatch (MB), based on the total weight of the crosslinked foam composition.

Nonlimiting examples of suitable additive are Polyethylene glycol 8000, available from The Dow Chemical Company, TiO$_2$, available from The Chemours Company, and carbon black, available from Cabot Corporation.

The foamable composition includes a blowing agent. In an embodiment, the blowing agent is a chemical blowing agent. The chemical blowing agent generates one or more physical blowing agents, by thermal decomposition in the foaming process. Chemical blowing agents include (but are not limited to) sodium bicarbonate, sodium borohydride, azodicarbonamide, azodiisobutyro-nitrile, barium azodicarboxylate, N,N'-dimethyl-N,N'-dinitrosoterephthalamide, and benzenesulfonhydrazide, 4,4-oxybenzene sulfonyl semicarbazide, 4,4'-oxybis(benzenesulfonicacid)dihydrazide, and p-toluene sulfonyl semicarbazide, trihydrazino triazine and mixtures such as those of citric acid and sodium bicarbonate.

In an embodiment, the chemical blowing agent is azodicarbonamide.

In an embodiment, the additive in the foamable composition includes (i) from 0.3 wt % to 3.0 wt % of polyethylene glycol (PEG), (ii) from 0.5 wt % to 5.0 wt % of TiO$_2$, (iii) from 0.3 wt % to 5.0 wt % of color masterbatch (MB), (iv) from 0.5 wt % to 5.0 wt % of azodicarbonamide, (v) from 0.05 wt % to 0.5 wt % of 1,3,5-Triallyl-1,3,5-triazine-2,4,6 (1H,3H,5H)-trione (TAlC), (vi) from 0.3 wt % to 1.5 wt % of bis(tert-butyldioxyiso-propyl)benzene (BIPB), (vii) from 0.3 wt % to 1.5 wt % of zinc oxide (ZnO), (viii) from 0.1 wt % to 0.7 wt % of stearic acid, (ix) from 0.1 wt % to 0.7 wt % of zinc stearate.

In an embodiment, the additive in the foamable composition includes (i) from 0.5 wt % to 2.0 wt % of polyethylene glycol (PEG), (ii) from 1.0 wt % to 3.0 wt % of TiO$_2$, (iii) from 0.5 wt % to 2.0 wt % of color masterbatch (MB), (iv) from 1.0 wt % to 2.5 wt % of azodicarbonamide, (v) from 0.05 wt % to 0.3 wt % of 1,3,5-Triallyl-1,3,5-triazine-2,4,6 (1H,3H,5H)-trione (TAlC), (vi) from 0.6 wt % to 1.0 wt % of bis(tert-butyldioxyiso-propyl)benzene (BIPB), (vii) from 0.6 wt % to 1.2 wt % of zinc oxide (ZnO), (viii) from 0.3 wt % to 0.6 wt % of stearic acid, (ix) from 0.3 wt % to 0.6 wt % of zinc stearate.

The foamable composition (the (i) ethylene/α-olefin multi-block copolymer, (ii) ethylene/propylene/diene terpolymer (EPDM), (iii) optional silicone rubber, (iv) optional blend component selected from ethylene/α-olefin random copolymer, ethylene-vinyl acetate copolymer (EVA), styrene-butadiene block copolymer, hydrogenated styrene-butadiene block copolymer, and combinations thereof, (v) optional plasticizer, (vi) optional filler, (vii) optional additive, (viii) crosslinking agent/coagent, and (ix) blowing agent/accelerator) is subjected to a foaming process whereby the foamable composition is melt-mixed in an internal mixer to melt the polymers and to blend the crosslink agent/coagent, blowing agent/accelerator, filler, and additives into the melt-mix. The melt-mix is subsequently milled on a roll mill for further mixing and dropped into an extruder to make pellets. The pellets are injected into an injection mold. After injection into the mold and the compounds are fully cured, the mold is opened rapidly, thereby dropping the pressure within the mold and triggers expansion of the melt-mix to form a crosslinked foam. The crosslinked foam is composed of, or otherwise is formed from, the foamable composition.

In an embodiment, the crosslinked foam composition includes (A) from 50 wt % to 70 wt %, or from 55 wt % to 65 wt % of the ethylene/α-olefin multi-block copolymer (with the multi-block properties (i)-(ix));

(B) from 16 wt % to 36 wt %, or from 20 wt % to 30 wt % of the EPDM (with EPDM properties (i)-(iv));

(C) 0 wt %, or from 2 wt % to 12 wt %, or from 5 wt % to 10 wt % of the silicone rubber (with SiR properties (i)-(ii));

(D) 0 wt %, or from 10 wt % to 70 wt %, or from 30 wt % to 50 wt % of the blend component selected from ethylene/α-olefin random copolymer, ethylene-vinyl acetate copolymer, styrene-butadiene block copolymer, hydrogenated styrene-butadiene block copolymer, and combinations thereof;

(E) 0 wt %, or from 5 wt % to 30 wt %, or from 10 wt % to 20 wt % of the plasticizer;

(F) 0 wt %, or from 1 wt % to 20 wt %, or from 3 wt % to 9 wt % of the filler; and (G) 0 wt %, or from 1 wt % to 9 wt % of the additive, the sum of components (A)-(G) amount to 100 wt % of the crosslinked foam composition, and the crosslinked foam composition has one, some, or all of the following properties:

(i) a density from 0.10 to 0.30 g/cc, or from 0.15 g/cc to 0.20 g/cc; and/or (ii) an Asker C hardness from 20 degree to 40 degree, or from 25 degree to 38 degree, or from 32 degree to 38 degree, or from 34 degree to 38 degree; and/or (iii) a tensile strength or 1.0 MPa to 3.0 MPa, or from 1.5 MPa to 2.0 MPa, or from 1.0 MPa to 1.8 MPa, or from 1.2 MPa to 1.6 MPa; and/or (iv) an ultimate elongation from 300% to 600%, or from 400% to 500%, or from 400% to 600%, or from 450% to 550%; and/or (v) a Rebound from 50% to 75%, or from 60% to 70%, or from 63% to 67%; and/or (vi) a compression set from 5% to 25%, or from 10% to 25%, or from 15% to 20% at 23° C./24 hr; and/or (vii) a thermal shrinkage from 3% to 10%, or from 4% to 7% at 65° C./72 hr (hereafter referred to as Foam1).

B. Adhesive Layer

The article includes an adhesive layer. The term "adhesive layer," as used herein, is a layer located between the crosslinked foam composition and the substrate, the adhesive layer bonding the crosslinked foam composition to the substrate. The adhesive layer is composed of (i) an ethylene elastomer, (ii) a tackifier, and (iii) a wax.

The adhesive layer includes an ethylene elastomer. The ethylene elastomer is different than the ethylene-α-olefin multi-block copolymer. The ethylene elastomer is composed of, or otherwise consists of, ethylene, and one copolymerizable α-olefin comonomer or polar comonomer in polymerized form. The α-olefin comonomer is selected from butene, hexene, and octene. The polar comonomer is selected from vinyl acetate, methyl acetate, ethyl acetate, butyl acetate, acrylic acid, methyl acrylic acid, maleic anhydride monoester, and combinations thereof.

In an embodiment, the ethylene elastomer is an ethylene/octene copolymer and has one, some, or all of the following properties:

(i) a density from 0.850 g/cc to 0.895 g/cc, or from 0.860 g/cc to 0.885 g/cc or from 0.865 g/cc to 0.875 g/cc; and/or (ii) a melting temperature, Tm, from 50° C. to 90° C., or from 60° C. to 80° C., or from 65° C. to 75° C.; and/or (iii) a melt viscosity (at 177° C.) 1,000 mPa·s to 50,000 mPa·s, or from 5,000 mPa·s to 30,000 mPa·s, or from 10,000 mPa·s to 20,000 mPa·s (hereafter elastomer properties (i)-(iii)).

In an embodiment, the ethylene elastomer is an ethylene/vinyl acetate copolymer and has one, some, or all of the following properties:

(i) a density from 0.930 g/cc to 0.970 g/cc, or from 0.940 g/cc to 0.960 g/cc; and/or (ii) a melting temperature, Tm, from 45° C. to 100° C., or 55° C. to 90° C.; and/or (iii) a melt viscosity (at 177° C.) 1,000 mPa·s to 50,000 mPa·s, or from 10,000 mPa·s to 40,000 mPa's (hereafter elastomer properties (iv)-(vi)).

Nonlimiting examples of suitable ethylene elastomer include AFFINITY™ GA 1950 and ELVAX™ 210W, available from The Dow Chemical Company.

The adhesive layer includes a tackifier. Non-limiting examples of suitable tackifiers include (1) natural and modified rosins (e.g., gum rosin, wood rosin, tall oil rosin, distilled rosin, hydrogenated rosin, dimerized rosin, and polymerized rosin); (2) glycerol and pentaerythritol esters of natural and modified rosins (e.g., the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin); (3) copolymers and terpolymers of natured terpenes (e.g., styrene/terpene and alpha methyl styrene/terpene); (4) polyterpene resins and hydrogenated polyterpene resins; (5) phenolic modified terpene resins and hydrogenated derivatives thereof (e.g., the resin product resulting from the condensation, in an acidic medium, of a bicyclic terpene and a phenol); (6) aliphatic or cycloaliphatic hydrocarbon resins and the hydrogenated derivatives thereof (e.g., resins resulting from the polymerization of monomers consisting primarily of olefins and diolefins); (7) aromatic hydrocarbon resins and the hydrogenated derivatives thereof; (8) aromatic modified aliphatic or cycloaliphatic hydrocarbon resins and the hydrogenated derivatives thereof; and combinations thereof.

In an embodiment, the tackifier is a hydrogenated cycloaliphatic hydrocarbon resin and has one, some, or all of the following properties:

(i) an Mw from 400 g/mol, or 500 g/mol, or 570 g/mol, or 600 g/mol, or 620 g/mol, or 650 g/mol, to 690 g/mol, or 720 g/mol, or 770 g/mol, or 1000 g/mol, or 1200 g/mol, or 1500 g/mol; and/or (ii) a melt viscosity at 160° C., from 200 mPa·s, or 400 mPa·s, or 700 mPa·s, or 750 mPa·s, to 850 mPa·s, or 900 mPa·s, or 1500 mPa·s, or 2000 mPa·s (hereafter tackifier properties (i)-(ii)).

A nonlimiting example of a suitable tackifier is Escorez™ 5400, available from ExxonMobil Chemical Company.

The adhesive layer includes a wax. Nonlimiting examples of suitable waxes include propylene-based polymer waxes, paraffin waxes, microcrystalline waxes, polyethylene waxes, Fischer-Tropsch waxes, oxidized Fischer-Tropsch waxes and functionalized waxes such as hydroxy stearamide waxes and fatty amide waxes.

In an embodiment, the wax is a Fischer-Tropsch wax and has one, some, or all of the following properties:

(i) a congealing point from 80° C., or 90° C., to 100° C., or 120° C.; and/or (ii) a Brookfield viscosity at 135° C., from 1 mPa·s, or 5 mPa·s, or 7 mPa·s, to 10 mPa·s, or 20 mPa·s, or 40 mPa·s, or 50 mPa·s, or 100 mPa·s; and/or (iii) a melt viscosity at 135° C. from 1 mPa·s to 100 mPa·s, or from 5 mPa·s to 20 mPa·s, or from 6 mPa·s to 10 mPa·s (hereafter wax properties (i)-(iii)).

A nonlimiting example of a suitable wax is Sasolwax H1, available from Sasol.

In an embodiment, the adhesive layer includes (A) ethylene elastomer in an amount from 20 wt % to 60 wt %, or from 30 wt % to 50 wt %, or from 35 wt % to 45 wt % (with elastomer properties (i)-(iii) or elastomer properties (iv)-(vi);

(B) tackifier in an amount from 20 wt % to 60 wt %, or from 30 wt % 50 wt %, or from 35 wt % to 45 wt % (with tackifier properties (i)-(ii)); and (C) wax in an amount 5 wt % to 30 wt %, or from 5 wt % to 25 wt %, or from 10 wt % to 25 wt %, wherein weight percent is based on the total weight of the adhesive layer (with wax properties (i)-(iii)) (hereafter adhesive1).

C. Substrate

The article includes the substrate. The substrate is composed of a component selected from an olefin-based polymer, an engineering plastic, and combinations thereof. The olefin-based polymer is an ethylene-based polymer or a propylene-based polymer.

In an embodiment, the olefin-based polymer is a propylene impact copolymer. The propylene impact copolymer is a two-phase polymer wherein a rubber phase (or a discontinuous phase) of discrete domains of ethylene/propylene copolymer is dispersed throughout a matrix phase (or a continuous phase) of propylene homopolymer. The propylene impact copolymer contains from 0.1 wt % to 15 wt %, or from 0.5 wt % to 10 wt %, or from 3 wt % to 8 wt % ethylene/propylene rubber phase, based on the total weight of the propylene impact copolymer.

In an embodiment, the propylene impact copolymer has one, some, or all of the following properties:

(i) from 1 wt % to 10 wt %, or from 3 wt % to 8 wt % ethylene/propylene rubber phase; and/or (ii) a density from 0.89 g/cc to 0.92 g/cc, or from 0.89 g/cc to 0.91 g/cc; and/or (iii) a MFR from 0.5 g/10 min to 5.0 g/10 min, or from 0.5 g/10 min to 3.5 g/10 min, or from 0.5 g/10 min to 1.0 g/10 min.

A nonlimiting example of a suitable propylene impact copolymer is K8303, available from SINOPEC Yanshan Petrochemical Company.

In an embodiment, the substrate is an engineering plastic. An "engineering plastic," as used herein is a polymeric material selected from an acrylonitrile-butadiene-styrene (ABS) copolymer, high impact polystyrene (HIPS) copolymer, and combinations thereof.

D. Article

The article includes (A) the crosslinked foam composition, (B) the adhesive layer, and (C) the substrate. The adhesive layer bonds the cross-linked foam composition to the substrate.

In an embodiment, the article includes (A) the crosslinked foam composition of Foam1 in direct contact with (B) adhesive layer of adhesive1, which is in direct contact with (C) the substrate composed of impact propylene copolymer.

In an embodiment, the article includes (1) the crosslinked foam composition with (A) from 50 wt % to 70 wt %, or from 55 wt % to 65 wt % of the ethylene/α-olefin multi-block copolymer (with the multi-block properties (i)-(ix));

(B) from 16 wt % to 36 wt %, or from 20 wt % to 30 wt % of the EPDM (with EPDM properties (i)-(iv));

(C) from 5 wt % to 10 wt % of the silicone rubber (with SiR properties (i)-(ii));

(F) from 3 wt % to 9 wt % of the filler; and (G) from 1 wt % to 5.0 wt % of the additive selected from (i) polyethylene glycol (PEG), (ii) TiO$_2$, (iii) color masterbatch (MB), the sum of components (A), (B), (C), (F), and (G) amount to 100 wt % of the crosslinked foam composition, and the crosslinked foam composition has one, some, or all of the following properties:

(i) a density from 0.10 to 0.30 g/cc, or from 0.15 g/cc to 0.20 g/cc; and/or (ii) an Asker C hardness from 20 degree to 40 degree, or from 25 degree to 38 degree, or from 32 degree to 38 degree, or from 34 degree to 38 degree; and/or (iii) a tensile strength or 1.0 MPa to 3.0 MPa, or from 1.5 MPa to 2.0 MPa, or from 1.0 MPa to 1.8 MPa, or from 1.2 MPa to 1.6 MPa; and/or (iv) an ultimate elongation from 300% to 600%, or from 400% to 500%, or from 400% to 600%, or from 450% to 550%; and/or (v) a Rebound from 50% to 75%, or from 60% to 70%, or from 63% to 67%; and/or (vi) a compression set from 5% to 25%, or from 10% to 25%, or from 15% to 20% at 23° C./24 hr; and/or (vii) a thermal shrinkage from 3% to 10%, or from 4% to 7% at 65° C./72 hr (2) the adhesive layer with (A) ethylene elastomer in an amount from 30 wt % to 50 wt %, or from 35 wt % to 45 wt % (with elastomer properties (i)-(iii) or elastomer properties (iv)-(vi));

(B) tackifier in an amount from 30 wt % 50 wt %, or from 35 wt % to 45 wt % (with tackifier properties (i)-(ii)); and (C) wax in an amount from 5 wt % to 25 wt %, or from 10 wt % to 25 wt % (with wax properties (i)-(iii)), wherein the sum of components (A), (B), and (C) amount to 100 wt % of the adhesive layer; and (3) the substrate composed of a propylene impact copolymer, and the article has a bonding strength at 23° C. from greater than 113 N/30 mm to 133 N/30 mm, or from 120 N/30 mm to 130 N/30 mm, or from greater than 120 N/30 mm to 125 N/30 mm.

In an embodiment, the article is configured as a bicycle saddle, a moped seat, a motorcycle seat, other outdoor seating (for boat, wagon, stroller, carriage, trailer, etc.), padding for outdoor furniture, and any combinations thereof.

By way of example, and not limitation, some embodiments of the present disclosure are described in detail in the following examples.

Examples

The raw materials used in the preparation for the present crosslinked foam composition, the adhesive layer, and the substrate in the Inventive Examples ("IE") are provided in Table 1 below.

TABLE 1

| Starting materials for the foam, adhesive layer, and substrate | | |
|---|---|---|
| Component | Specification | Source |
| INFUSE ™ 9507 | Ethylene/octene multi-block copolymer, CAS: 26221-73-8, density: 0.866 g/cc; MI: 5.0 g/10 min, Tm: 119° C. | The Dow Chemical Company |
| NORDEL ™ 3720P | Ethylene/propylene/diene terpolymer (EPDM), CAS: 9010-79-1 Density: 0.88 g/cc; Mooney viscosity (125° C., ML 1 + 4): 20; Ethylene content: 69 wt %;(ENB) content: 0.5 wt % | The Dow Chemical Company |
| XIAMETER RBB-2003-50 | Silicon Rubber (SIR), CAS: 556-67-2 Density: 1.14 g/cc; Shore A hardness: 53 | The Dow Chemical Company |
| Luperox F40P | Crosslinking agent, CAS: 25155-25-3, 40% of Bis(tert-butyldioxyisopropyl)benzene (BIPB) | Arkema |
| TAIC | Crosslinking coagent, CAS: 1025-15-6 | ThermoFisher Scientific |
| AC9000F | Blowing agent, azodicarbonamide, CAS: 123-77-3 | Kumyang Co., Ltd. |

TABLE 1-continued

Starting materials for the foam, adhesive layer, and substrate

| Component | Specification | Source |
|---|---|---|
| Talc | Filler, CAS: 14807-96-6 | Haicheng Zhongguan Co., Ltd. |
| Zinc Oxide (ZnO) | Blowing agent activator, CAS: 1314-13-2 | NewEdge Metal Co., Ltd. |
| Zinc Stearate (ZnSt) | Blowing agent activator, CAS: 557-05-1 | Sinopharm |
| Stearic acid | Blowing agent activator, CAS: 57-11-4 | Sinopharm |
| PEG 8000 | Processing aid, polyethylene glycol, CAS: 25322-68-3 | The Dow Chemical Company |
| $TiO_2$ | UV inhibitor, CAS: 13463-67-7 | The Chemours Company |
| Carbon black | Color Masterbatch, CAS: 1333-86-4 | Cabot Corporation |
| Affinity GA 1950 | Ethylene/octene copolymer<br>Density: 0.874 g/cc<br>Melt viscosity at 177° C. (Brookfield): 17,000 mPa · s | The Dow Chemical Company |
| Elvax 210W | Ethylene-vinyl acetate copolymer<br>Density: 0.951 g/mL<br>Melt viscosity at 177° C. (Brookfield): 30,000 mPa · s | The Dow Chemical Company |
| Escorez 5400 | Tackifier, hydrogenated hydrocarbon resin Molecular<br>weight (Mw): 670 g/mol, melt viscosity at 160° C.: 800<br>mPa · s | ExxonMobil Chemical |
| Sasolwax H1 | Fischer Tropsch wax, ethylene based polymer wax<br>Density: 0.944 g/cc<br>Acid number: <0.1 mg KOH/g<br>Congealing point: 96-100° C.<br>Drop melting point: 112° C.<br>Melt viscosity at 135° C. (Brookfield): 6-10 mPa · s | Sasol |
| K8303 | Propylene impact copolymer, MFR: 0.7 g/10 min,<br>density: 0.9 g/cc, CAS: 9003-07-0 | SINOPEC Yanshan<br>Petrochemical Company |

1. Foam Preparation (1) Compounding:

The ingredients were added to the mixer in the following order: INFUSE™ 9507 (ethylene/octene multi-block copolymer), NORDEL™ 3720P (EPDM), and XIAMETER RBB-2003-50 (silicone rubber), followed by ZnO, ZnSt, and talc (filler). After the ethylene/octene multi-block copolymer, EPDM, and silicone rubber have melted, the peroxide/blowing agent was added, to form the foamable composition. The total mix time was 10-15 minutes with control of the melt temperature below 130° C. The rotor speed was 30-50 rpm. The resulting batch was then quickly dropped onto a two roll mill to completely mix any ingredients remaining on the surface when dropped from the mixer. The roll mill was set at 80-120° C. and 7-8 rpm. The compound was then dropped into a single screw extruder connected with a pelletizer to make the pellets for compression molding or injection molding.

(2) Foaming

The pellets (of the present foamable composition) were fed into an injection molding machine with screw temperature set at 110° C. The melted pellets were then injected into a mold set at temperature of 175° C., and kept in the mold for 400-700 seconds. When the mold was open, bun foams (composed of the present crosslinked foam composition) were obtained. With different mold design, foams with various shapes (foam slabs, foam saddle pads) were produced. The formulation for the foamable composition is provided in Table 2A below. The formulation of the resultant crosslinked foam composition in the form of a crosslinked foam pad is provided in Table 2B below.

TABLE 2A

Formulation of the foamable composition

| Formulation | PHR | Wt % |
|---|---|---|
| INFUSE ™ 9507 | 70.0 | 56.9% |
| NORDEL ™ 3720P | 30.0 | 24.4% |
| Luperox F40P | 1.1 | 0.89% |

TABLE 2A-continued

Formulation of the foamable composition

| Formulation | PHR | Wt % |
|---|---|---|
| TAIC | 0.15 | 0.12% |
| PEG 8000 | 1.0 | 0.81% |
| AC9000F | 2.2 | 1.8% |
| ZnO | 1.0 | 0.81% |
| Stearic Acid | 0.5 | 0.41% |
| ZnSt | 0.5 | 0.41% |
| SIR RBB-2003-50 | 8.0 | 6.5% |
| Talc | 5.0 | 4.1% |
| $TiO_2$ | 2.5 | 2.0% |
| Color MB | 1.0 | 0.81% |
| Total | 123.0 | 100% |

TABLE 2B

Formulation and physical properties of the crosslinked foam composition (in form of foam pad)

| | PHR | Wt % |
|---|---|---|
| Formulation | | |
| INFUSE ™ 9507 | 70.0 | 59.6% |
| NORDEL ™ 3720P | 30.0 | 25.5% |
| PEG 8000 | 1.0 | 0.85% |
| SIR RBB-2003-50 | 8.0 | 6.8% |
| Talc | 5.0 | 4.3% |
| $TiO_2$ | 2.5 | 2.1% |
| Color MB | 1.0 | 0.85% |
| Total | 117.5 | 100% |
| Properties | | |
| Linear expansion ratio | | 1.6 |
| Foam density | | 0.18 g/cc |
| ASK-C hardness | | 36 degree |
| Tensile strength | | 1.3 MPa |
| Ultimate elongation | | 490% |
| Rebound | | 65% |
| Type C Tear | | 6.2 N/mm |

TABLE 2B-continued

Formulation and physical properties of the crosslinked
foam composition (in form of foam pad)

| | PHR | Wt % |
|---|---|---|
| Compression set (C-set), 23° C./24 h | | 18% |
| Compression set (C-set), 50° C./6 h | | 61% |
| Thermal Shrinkage at 65° C./72 h | | 5.4% |
| Thermal Shrinkage at 70° C./40 min | | 0.3% |

2. Heat Resistance/Thermal Shrinkage

The heat resistance/thermal shrinkage of the present crosslinked foam composition when treated at various thermal conditions (65° C., and 70"° C.) is listed in Table 2B. Table 2B shows that the present crosslinked foam composition with thermal shrinkage of 5.4% at 65° C. for 72 hour (h) meets the general industry standard (foam saddle) for thermal shrinkage resistance that is less than 8% at 65° C./72h.

3. Substrate Preparation

The substrate composed of propylene impact copolymer with designed configuration was produced by the injection molding process with screw temperature at 190° C., and mold temperature at 23° C.

4. Adhesive Layer Preparation

Affinity GA 1950 or Elvax 210W (ethylene elastomer), Escorez 5400 (tackifier), and Sasolwax H1 (wax) were weighed into an iron container, preheated in an oven at 177° C. for one hour. The components in the container were then mixed in a heated block at 177° C. for 30 minutes, with a "Paravisc style" mixer head at 100 RPM. The adhesive formulation is provided in Table 3 below.

TABLE 3

Formulations of the adhesive layer.

| | Wt % |
|---|---|
| Formulation 1 | |
| Affinity GA 1950 | 40% |
| Escorez 5400 | 40% |
| Sasolwax H1 | 20% |
| Formulation 2 | |
| Elvax 210W | 40% |
| Escorez 5400 | 40% |
| Sasolwax H1 | 20% |

5. Fabrication of the Foam/Adhesive Layer/Substrate Article

In the assembly process, the adhesive formulation 1 or 2 was fully melted (at temperature greater than 160° C.) and then applied onto the surface of the propylene impact copolymer substrate directly without surface pre-treatment. The crosslinked foam composition in the form of a foam pad (from Table 2B) was bonded to the substrate quickly before solidification of the adhesive formulation to form the article composed of (A) crosslinked foam composition layer, (B) adhesive layer, and (C) substrate. The article was subjected to hot oven lines with multi-stage heating units set at 100-140° C. (from inlet to outlet) for 30 minutes. The thermal treatment of the article causes slight shrinkage of the foam pad. A schematic representation of the article is illustrated in FIG. 1 and is hereafter referred to as inventive article with crosslinked foam composition/adhesive/substrate layers.

6. Properties of Article with Crosslinked Foam Composition/Adhesive/Substrate Layers Heat Absorption Resistance The heat absorption resistance of a PU foam saddle (comparative sample ("CS")) and foam saddles with the inventive crosslinked foam/adhesive/substrate layer structure were tested as shown in Table 4 below. Comparative Sample is a black PU foam saddle and is denoted as CS-1. IE-1 is a black foam saddle with inventive article with crosslinked foam composition/adhesive/substrate layers. IE-2 is a white foam saddle with inventive article with crosslinked foam composition/adhesive/substrate layers.

TABLE 4

Heat absorption resistance test of PU and foam saddles with
foam/adhesive layer/substrate.

| | | CS-1 | IE-1 | IE-2 |
|---|---|---|---|---|
| Test condition: cloudy day; | Surface Temperature (° C.) after 2 hours under sunlight | 45.0 | 43.0 | 37.0 |
| Environmental temperature: 34° C. | Surface Temperature (° C.) after 2 minutes when sunlight removed | 32.5 | 32.0 | 29.5 |
| Test condition: sunny day; | Surface Temperature (° C.) after 2 hours under sunlight | 68.0 | 63.0 | 42.0 |
| Environmental temperature: 36° C. | Surface Temperature (° C.) after 2 minutes when sunlight removed | 40.0 | 36.0 | 33.5 |

Table 4 shows the surface temperature of CS-1, IE-1, and IE-2 after treatment under sunlight for certain time. The white foam saddle with inventive article with crosslinked foam composition/adhesive/substrate layers (IE-2) showed at most 8° C. lower in surface temperature than the PU foam (CS-1) after two hours under sunlight with an environmental temperature of 34° C. The black foam saddle with inventive article with crosslinked foam composition/adhesive/substrate layers (IE-1) showed at least 5° C. lower in surface temperature than the PU foam (CS-1) after two hours under sunlight with an environmental temperature of 36° C.

7. Water Resistance of the Inventive Article with Crosslinked Foam Composition/Adhesive/Substrate Layers The crosslinked foam composition of the inventive article with crosslinked foam composition/adhesive/substrate layers has a closed cell structure and is water resistant. PU foams have an open cell structure and are generally hydrophilic in nature.

Cut Resistance of the Inventive Foam

The inventive article with crosslinked foam composition/adhesive/substrate layers showed an integrated structure with no separate skin layers after being cut, as demonstrated in FIG. 2a. The PU foam showed a destroyed PU leather skin layer after being cut, as demonstrated in FIG. 2b.

8. Bonding Strength Inventive Article with Crosslinked Foam Composition/Adhesive/Substrate Layers Table 5 shows the bonding strength of the inventive article with crosslinked foam composition/adhesive/substrate layers measured at various environmental temperatures. IE-3 is an article composed of foam/adhesive layer/substrate, with adhesive layer made from formulation 1 in Table 3. IE-4 is an article composed of foam/adhesive layer/substrate, with adhesive layer made from formulation 2 in Table 3. Bonding strength of greater than 130 N/30 mm was obtained at −20° C., where the substrate failure mode was observed (foam destroyed). Bonding strength of greater than 113 N/30 mm to 133 N/30 mm (122-123 N/30 mm) was obtained at 23° C., where the substrate failure mode was also observed.

TABLE 5

Bonding strength of foam/adhesive layer/substrate articles.

| Test Temperature (° C.) | IE-3 Max force (N/30 mm) | IE-4 Max force (N/30 mm) |
|---|---|---|
| −20.0 | 164, foam destroyed | 138, foam destroyed |
| 23.0 | 123, foam destroyed | 122, foam destroyed |
| 60.0 | 13, delaminated | 19, delaminated |
| 70.0 | 11, delaminated | 9, delaminate |

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:
1. An article comprising:
(A) a crosslinked foam composition comprising
(i) an ethylene/α-olefin multi-block copolymer,
(ii) an ethylene/propylene/diene terpolymer (EPDM),
(iii) optional silicone rubber,
(iv) optional blend component selected from the group consisting of ethylene/α-olefin random copolymer, ethylene-vinyl acetate copolymer, styrene-butadiene block copolymer, hydrogenated styrene-butadiene block copolymer, and combinations thereof,
(v) optional plasticizer,
(vi) optional filler, and
(vii) optional additive;
(B) an adhesive layer comprising
(i) an ethylene elastomer;
(ii) a tackifier; and
(iii) a wax, wherein (B) (i), (B) (ii), and (B) (iii) amount to 100 wt % of the adhesive layer; and
(C) a substrate composed of a polymeric material selected from the group consisting of a propylene impact copolymer, acrylonitrile-butadiene-styrene copolymer, high impact polystyrene copolymer, and combinations thereof.
2. The article of claim 1 wherein the crosslinked foam composition (A) comprises
(i) from 50 wt % to 70 wt % of the ethylene/α-olefin multi-block copolymer,
(ii) from 16 wt % to 36 wt % of the ethylene/propylene/diene terpolymer (EPDM), based on the total weight of the crosslinked foam composition.
3. The article of claim 2 wherein the crosslinked foam composition (A) comprises
(iii) from greater than 0 wt % to 12 wt % silicone rubber.

4. The article of claim 1 wherein the crosslinked foam composition (A) comprises
(iv) from greater than 0 wt % to 20 wt % filler.
5. The article of claim 1 wherein the crosslinked foam composition (A) comprises
(v) from greater than 0 wt % to 9 wt % one or more additives selected from the group consisting of processing aid, UV inhibitor, a coloring agent, and combinations thereof.
6. The article of claim 1 wherein the foam composition (A) has
a density from 0.1 g/cc to 0.3 g/cc;
a compression set from 5% to 25% at 23° C./24 hr; and
a thermal shrinkage from 3% to 10% at 65° C./72 hr.
7. The article of claim 1 wherein the adhesive layer (B) comprises
(i) from 20 wt % to 60 wt % of the ethylene elastomer;
(ii) from 20 wt % to 60 wt % of the tackifier; and
(iii) from 5 wt % to 30 wt % of the wax;
based on the total weight of the adhesive layer (B).
8. An article comprising:
(A) a crosslinked foam composition comprising
(i) an ethylene/α-olefin multi-block copolymer,
(ii) an ethylene/propylene/diene terpolymer (EPDM),
(iii) optional silicone rubber,
(iv) optional blend component selected from the group consisting of ethylene/α-olefin random copolymer, ethylene-vinyl acetate copolymer, styrene-butadiene block copolymer, hydrogenated styrene-butadiene block copolymer, and combinations thereof,
(v) optional plasticizer,
(vi) optional filler, and
(vii) optional additive;
(B) an adhesive layer comprising
(i) an ethylene elastomer;
(ii) a tackifier; and
(iii) a wax, wherein (B) (i), (B) (ii), and (B) (iii) amount to 100 wt % of the adhesive layer; and
(C) a substrate comprising a propylene impact copolymer having a melt flow rate from 0.5 g/10 min to 5.0 g/10 min.
9. The article of claim 1 wherein the polymeric material for substrate (C) is selected from the group consisting of acrylonitrile-butadiene-styrene copolymer, high impact polystyrene copolymer, and combinations thereof.
10. The article of claim 1 wherein the polymeric material for substrate (C) is the propylene impact copolymer.
11. The article of claim 1 wherein the adhesive layer comprises
(i) from 35 wt % to 45 wt % of the ethylene elastomer, wherein the ethylene elastomer is an ethylene/α-olefin copolymer;
(ii) from 35 wt % to 45 wt % of the tackifier; and
(iii) from 10 wt % to 25 wt % of the wax.
12. The article of claim 1 wherein the adhesive layer comprises
(i) from 35 wt % to 45 wt % of the ethylene elastomer, wherein the ethylene elastomer is an ethylene/vinyl acetate copolymer;
(ii) from 35 wt % to 45 wt % of the tackifier; and
(iii) from 10 wt % to 25 wt % of the wax.
13. The article of claim 8 wherein the article has a bonding strength from 113 N/30 mm to 133 N/30 mm at 23° C.
14. An article comprising:
(A) a crosslinked foam composition comprising
(i) an ethylene/α-olefin multi-block copolymer,
(ii) an ethylene/propylene/diene terpolymer (EPDM),
(iii) optional silicone rubber, (iv) optional blend component selected from the group consisting of ethylene/α-olefin random copolymer, ethylene-vinyl acetate copolymer, styrene-butadiene block copolymer, hydrogenated styrene-butadiene block copolymer, and combinations thereof, (v) optional plasticizer, (vi) optional filler, and (vii) optional additive;

(B) an adhesive layer comprising (i) an ethylene elastomer;

(ii) a tackifier; and (iii) a wax, wherein (B) (i), (B) (ii), and (B) (iii) amount to 100 wt % of the adhesive layer; and (C) a substrate comprising a propylene impact copolymer having a melt flow rate from 0.5 g/10 min to 1.0 g/10 min.

15. The article of claim 14 wherein the adhesive layer comprises (i) from 35 wt % to 45 wt % of the ethylene elastomer, wherein the ethylene elastomer is an ethylene/α-olefin copolymer;

(ii) from 35 wt % to 45 wt % of the tackifier; and (iii) from 10 wt % to 25 wt % of the wax.

16. The article of claim 14 wherein the adhesive layer comprises (i) from 35 wt % to 45 wt % of the ethylene elastomer, wherein the ethylene elastomer is an ethylene/vinyl acetate copolymer;

(ii) from 35 wt % to 45 wt % of the tackifier; and (iii) from 10 wt % to 25 wt % of the wax.

\* \* \* \* \*